(12) United States Patent
Lim

(10) Patent No.: US 11,526,237 B1
(45) Date of Patent: Dec. 13, 2022

(54) TOUCH SENSING APPARATUS, TOUCH SENSING DISPLAY SYSTEM INCLUDING THE SAME, AND TOUCH SENSING METHOD

(71) Applicant: LX Semicon Co., Ltd., Daejeon (KR)

(72) Inventor: Yang Been Lim, Daejeon (KR)

(73) Assignee: LX Semicon Co., Ltd, Daejeon (KR)

( * ) Notice: Subject to any disclaimer, the term of this patent is extended or adjusted under 35 U.S.C. 154(b) by 0 days.

(21) Appl. No.: 17/713,970

(22) Filed: Apr. 5, 2022

(30) Foreign Application Priority Data

Oct. 19, 2021  (KR) .................. 10-2021-0139192

(51) Int. Cl.
*G06F 3/041* (2006.01)
*G06F 3/044* (2006.01)

(52) U.S. Cl.
CPC .......... *G06F 3/04186* (2019.05); *G06F 3/044* (2013.01); *G06F 2203/04106* (2013.01)

(58) Field of Classification Search
CPC .............. G06F 3/04186; G06F 3/044; G06F 2203/04106
See application file for complete search history.

(56) References Cited

U.S. PATENT DOCUMENTS

2013/0057507 A1*  3/2013 Shin .............. G06F 3/0443
                                              345/174
2017/0177138 A1*  6/2017 Orlovsky ......... G06F 3/04166

FOREIGN PATENT DOCUMENTS

| KR | 2010-0010011 A | 1/2010 |
| KR | 2015-0004638 A | 1/2015 |
| KR | 2015-0077783 A | 7/2015 |
| KR | 2016-0036927 A | 4/2016 |

* cited by examiner

*Primary Examiner* — Michael Pervan
(74) *Attorney, Agent, or Firm* — Polsinelli PC

(57) ABSTRACT

A touch sensing apparatus includes a coordinate calculator configured to count a current number of touches and calculate an estimated number of touches, by the unit of touch group, by using touch data including touch coordinates of a plurality of touch electrodes, and detect a discontinuous touch corresponding to a touch group in which the current number of touches and the estimated number of touches are not the same; and a touch data generator configured to generate the touch data including corrected coordinate data.

11 Claims, 18 Drawing Sheets

Fig. 5

|   | ... | 6 | 7 | 8 | 9 | 10 | 11 | 12 | 13 | 14 | 15 ... |
|---|---|---|---|---|---|---|---|---|---|---|---|
| 2 | | X | X | X | X | X | X | X | X | X | X |
| 3 | | X | X | 39 | X | X | X | X | X | X | X |
| 4 | | X | 32 | 98 | 43 | X | X | X | X | X | X |
| 5 | | X | X | 84 | 35 | X | X | X | 58 | X | X |
| 6 | | X | 28 | 93 | 39 | X | X | 20 | 95 | 43 | X |
| 7 | | X | X | 36 | X | X | X | X | 49 | X | X |
| 8 | | X | X | X | X | X | X | X | X | X | X |

Lb (left), Lb (right)

Fig. 6

|   | 6 | 7 | 8 | 9 | 10 | 11 | 12 | 13 | 14 | 15 |
|---|---|---|---|---|----|----|----|----|----|----|
| 2 | X | X | X | X | X  | X  | X  | X  | X  | X  |
| 3 | X | X | 39| X | X  | X  | X  | X  | X  | X  |
| 4 | X | 32| 98| 43| X  | X  | X  | X  | X  | X  |
| 5 | X | X | 84| 35| X  | X  | X  | 58 | X  | X  |
| 6 | X | 28| 93| 39| X  | X  | 20 | 95 | 43 | X  |
| 7 | X | X | 36| X | X  | X  | X  | 49 | X  | X  |
| 8 | X | X | X | X | X  | X  | X  | X  | X  | X  |

T1 at column 8, Lb1 labels region around T1, Lb2 labels region around T2.

Fig. 8

|    | ... 6 | 7 | 8 | 9 | 10 | 11 | 12 | 13 | 14 | 15 ... |
|----|---|---|---|---|----|----|----|----|----|----|
| ⋮  |   |   |   |   |    |    |    |    |    |    |
| 2  | X | X | X | X | X | X | X | X | X | X |
| 3  | X | X | 39 | X | X | X | X | X | X | X |
| 4  | X | 32 | 98 | 43 | X | X | X | X | X | X |
| 5  | X | X | 84 | 35 | X | X | X | 58 | X | X |
| 6  | X | 28 | 93 | 39 | X | X | 20 | 95 | 43 | X |
| 7  | X | X | 36 | X | X | X | X | 49 | X | X |
| 8  | X | X | X | X | X | X | X | X | X | X |
| ⋮  |   |   |   |   |    |    |    |    |    |    |

Labels: T1, T2, T3, Cf, Lb1, Lb2, Lb3

Fig. 10

|     | ... | 6 | 7 | 8  | 9  | 10 | 11 | 12 | 13 | 14 | 15 | ... |
|-----|-----|---|---|----|----|----|----|----|----|----|----|-----|
| 2   |     | X | X | X  | X  | X  | X  | X  | X  | X  | X  |     |
| 3   |     | X | X | 39 | X  | X  | X  | X  | X  | X  | X  |     |
| 4   |     | X | 32| 98 | 43 | X  | X  | X  | X  | X  | X  |     |
| 5   |     | X | X | 84 | 35 | X  | X  | X  | 58 | X  | X  |     |
| 6   |     | X | 28| 93 | 39 | X  | X  | 20 | 95 | 43 | X  |     |
| 7   |     | X | X | 36 | X  | X  | X  | X  | 49 | X  | X  |     |
| 8   |     | X | X | X  | X  | X  | X  | X  | X  | X  | X  |     |

TSP

Fig. 11

|   | 6 | 7 | 8 | 9 | 10 | 11 | 12 | 13 | 14 | 15 |
|---|---|---|---|---|----|----|----|----|----|----|
| 2 | X | X | X | X | X  | X  | X  | X  | X  | X  |
| 3 | X | X | 39| X | X  | X  | X  | X  | X  | X  |
| 4 | X | 32| 98| 43| X  | X  | X  | X  | X  | X  |
| 5 | X | X | 84| 35| X  | X  | X  | 58 | X  | X  |
| 6 | X | 28| 93| 39| X  | X  | 20 | 95 | 43 | X  |
| 7 | X | X | 36| X | X  | X  | X  | 49 | X  | X  |
| 8 | X | X | X | X | X  | X  | X  | X  | X  | X  |

Fig. 12

|   | 6 | 7 | 8 | 9 | 10 | 11 | 12 | 13 | 14 | 15 |
|---|---|---|---|---|----|----|----|----|----|----|
| 2 | X | X | X | X | X  | X  | X  | X  | X  | X  |
| 3 | X | X | 39| X | X  | X  | X  | X  | X  | X  |
| 4 | X | 32| 98| 43| X  | X  | X  | X  | X  | X  |
| 5 | X | X | 84| 35| X  | X  | X  | 58 | X  | X  |
| 6 | X | 28| 93| 39| X  | X  | 20 | 95 | 43 | X  |
| 7 | X | X | 36| X | X  | X  | X  | 49 | X  | X  |
| 8 | X | X | X | X | X  | X  | X  | X  | X  | X  |

TSP

Fig. 13

(N) Frame

TOUCH SENSING APPARATUS, TOUCH SENSING DISPLAY SYSTEM INCLUDING THE SAME, AND TOUCH SENSING METHOD

BACKGROUND

1. Technical Field

Embodiments relate to a touch sensing apparatus, a touch sensing display system including the same, and a touch sensing method.

2. Related Art

In general, a display apparatus including a touch screen panel capable of sensing a touch input by a user's finger or a stylus pen is widely used. Such a display apparatus includes a touch sensing apparatus which senses the occurrence of a touch and touch coordinates.

The display apparatus including the touch screen panel determines that a touch has occurred, when the level of an electrical signal according to a touch exceeds a preset threshold, calculates the location information of a point where the touch has occurred, and performs a relevant function on the basis of the calculated location information.

However, the conventional display apparatus has a problem in that when a user continuously touches the touch screen panel by a line drawing touch, a distortion occurs in the line drawing touch due to interference by noise, etc.

In particular, when the interval between a plurality of touches is narrow, the conventional display apparatus recognizes the plurality of touches as a single touch depending on the locations of a panel electrode and a target from which a touch is inputted, and thus, a problem may be caused in that a disconnection and a ghosting are caused in the line drawing touch.

In addition, the conventional display apparatus has a problem in that when a touch area is wide, a single touch is recognized as a plurality of touches.

SUMMARY

Various embodiments are directed to a touch sensing display system and a touch sensing method capable of clearly sensing changes of a plurality of touches.

Also, various embodiments are directed to a touch sensing display system and a touch sensing method capable of suppressing a disconnection and a ghosting occurring in a drawing touch.

Moreover, various embodiments are directed to a touch sensing display system and a touch sensing method capable of correcting current touch information by using previous touch information.

Further, various embodiments are directed to a touch sensing display system and a touch sensing method capable of recognizing a plurality of touches as a plurality of touches without erroneously recognizing the plurality of touches as a single touch.

In addition, various embodiments are directed to a touch sensing display system and a touch sensing method capable of recognizing a wide touch area as a single touch without erroneously recognizing the wide touch area as a plurality of touches.

In an embodiment, a touch sensing apparatus may include: a coordinate calculator configured to count a current number of touches and calculate an estimated number of touches, by the unit of touch group, by using touch data including touch coordinates of a plurality of touch electrodes, and detect a discontinuous touch among a plurality of touches corresponding to a touch group in which the current number of touches and the estimated number of touches are not the same; and a touch data generator configured to generate the touch data including corrected coordinate data, wherein the touch group includes at least one touch electrode among the plurality of touch electrodes, the estimated number of touches is a number of touches of a touch electrode to which touch has occurred most, among one or more touch electrodes included in the touch group, the touch group is a region which includes at least one among the plurality of touch electrodes, and the corrected coordinate data is coordinate data in which coordinates of the discontinuous touch are corrected.

Accordingly, when a discontinuous touch is sensed in a current frame, the touch sensing display system according to the embodiment may correct the touch point coordinates of the current frame by using the touch point coordinates of a previous frame. Therefore, when a disconnection occurs in some of a plurality of continuous touches in a drawing touch, the touch sensing display system according to the embodiment may correct a ghosting and a touch distortion occurring during the drawing touch by calculating the coordinates of corrected touches.

In an embodiment, a touch sensing method of a touch sensing apparatus suitable for generating touch data including touch coordinates of a plurality of touch electrodes may include: generating sensing data of each of the plurality of touch electrodes corresponding to a plurality of touches; counting a current number of touches by the unit of touch group by using the sensing data; calculating an estimated number of touches by the unit of touch group by using the sensing data; comparing the current number of touches and the estimated number of touches, and determining that a discontinuous touch has occurred among the plurality of touches, corresponding to a touch group in which the current number of touches and the estimated number of touches are not the same; and generating the touch data including corrected coordinate data, wherein the touch group includes at least one touch electrode among the plurality of touch electrodes, the estimated number of touches is a number of touches of a touch electrode to which touch has occurred most, among one or more touch electrodes included in the touch group, the touch group is a region which includes at least one among the plurality of touch electrodes, and the corrected coordinate data is coordinate data in which coordinates of the discontinuous touch are corrected.

Accordingly, when a discontinuous touch is sensed in a current frame, the touch sensing method according to the embodiment may correct the touch point coordinates of the current frame by using the touch point coordinates of a previous frame. Therefore, when a disconnection occurs in some of a plurality of continuous touches in a drawing touch, the touch sensing method according to the embodiment may correct a ghosting and a touch distortion occurring during the drawing touch by calculating the coordinates of corrected touches.

The touch sensing display system and the touch sensing method according to the embodiments may clearly sense changes of a plurality of touches.

Also, the touch sensing display system and the touch sensing method according to the embodiments may suppress a disconnection and a ghosting occurring in a drawing touch.

Moreover, the touch sensing display system and the touch sensing method according to the embodiments may correct current touch information by using previous touch information.

Further, the touch sensing display system and the touch sensing method according to the embodiments may recognize a plurality of touches as a plurality of touches without erroneously recognizing the plurality of touches as a single touch.

In addition, the touch sensing display system and the touch sensing method according to the embodiments may recognize a wide touch area as a single touch without erroneously recognizing the wide touch area as a plurality of touches.

BRIEF DESCRIPTION OF THE DRAWINGS

FIGS. 5 to 9 are diagrams for explaining a method for a labeling unit to set a label in accordance with an embodiment.

FIGS. 10 to 12 are diagrams for explaining a method for a labeling unit to set a labeling group in accordance with an embodiment.

FIG. 13 is a diagram for explaining a method for a coordinate calculator to generate the coordinates of a touch center point in accordance with an embodiment.

DETAILED DESCRIPTION

Hereinafter, a display system in accordance with an embodiment will be described with reference to FIG. 1.

Figure 1:
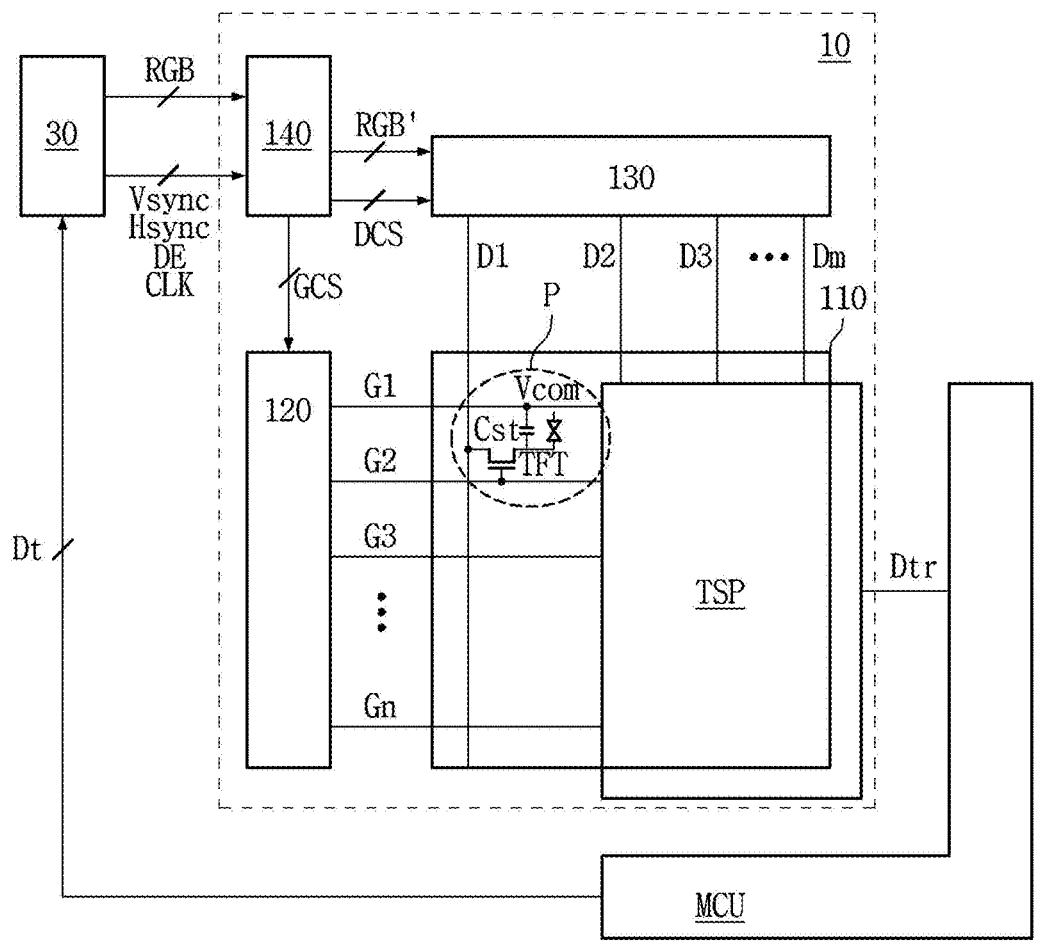
FIG. 1 is a diagram illustrating a display system including a touch sensing apparatus in accordance with an embodiment.

FIG. 1 is a diagram illustrating a display system including a touch sensing apparatus in accordance with an embodiment.

Referring to FIG. 1, a display system 1 in accordance with an embodiment includes a display apparatus 10, a micro controller unit MCU and a host apparatus 30.

The display apparatus 10 includes a display panel 110, a gate driver 120, a data driver 130, a timing controller 140 and a touch screen panel TSP.

The display panel 110 includes a plurality of gate lines G1 to Gn and a plurality of data lines D1 to Dm which are arranged to intersect with each other so as to define a plurality of pixel regions P, and pixels which are disposed in the plurality of pixel regions P, respectively. The plurality of gate lines G1 to Gn may be arranged in a horizontal direction, and the plurality of data lines D1 to Dm may be arranged in a vertical direction. However, the embodiment is not limited thereto. The display panel 110 may be a liquid crystal display (LCD) panel. The display panel 110 includes thin film transistors TFT which are formed in the plurality of pixel regions P, respectively, defined by the plurality of gate lines G1 to Gn and the plurality of data lines D1 to Dm, and a plurality of pixels which are electrically connected to the thin film transistors TFT, respectively.

The thin film transistors TFT supply data signals, supplied through the plurality of data lines D1 to Dm, to the corresponding pixels according to scan signals supplied through the plurality of gate lines G1 to Gn.

The pixel may be a liquid crystal cell including a common electrode and a sub pixel electrode connected to the thin film transistor TFT, which face each other with a liquid crystal interposed therebetween. The pixel may be equivalently represented by a liquid crystal capacitor. The pixel includes a storage capacitor Cst which is connected to the gate line of a previous stage to maintain a source signal charged in the liquid crystal capacitor until a next source signal is charged.

Meanwhile, the pixel region of the display panel 110 may be configured by red (R), green (G), blue (B) and white (W) subpixels. In an embodiment, the respective subpixels may be repeatedly formed in a row direction or may be formed in a 2*2 matrix form. A color filter corresponding to each color is disposed in each of the red (R), green (G) and blue (B) subpixels, but a separate color filter is not disposed in the white (W) subpixel. In an embodiment, the red (R), green (G), blue (B) and white (W) subpixels may be formed at the same area ratio. However, the red (R), green (G), blue (B) and white (W) subpixels may be formed at different area ratios.

The gate driver 120 includes a shift register which sequentially generates a scan signal, that is, a gate signal of an enable level, according to a gate control signal GCS of the timing controller 140. The thin film transistor TFT is turned on according to the scan signal of the enable level. The gate driver 120 may be disposed on one side of the display panel 110, for example, the left side of the display panel 110. However, the embodiment is not limited thereto, and the gate driver 120 may be disposed on the left and right sides of the display panel 110 to face each other. The gate driver 120 may include a plurality of gate driver integrated circuits (ICs) (not illustrated). The gate driver 120 may be implemented in the form of a tape carrier package in which the gate driver ICs are mounted. However, the embodiment is not limited thereto, and the gate driver ICs may be directly mounted to the display panel 110.

The data driver 130 converts an image data signal of the timing controller 140 into an analog source signal, and outputs the analog source signal to the display panel 110. In detail, the data driver 130 outputs the analog source signal to each of the plurality of data lines D1 to Dm in response to a data control signal DCS of the timing controller 140. The data driver 130 may be disposed on one side of the display panel 110, for example, the top side of the display panel 110. However, the embodiment is not limited thereto, and the data driver 130 may be disposed on one side and the other side, for example, both the top and bottom sides, of the display panel 110 to face each other. The data driver 130 may include a plurality of source driver ICs (not illustrated) each of which converts an image data signal transmitted from the timing controller 140 into an analog source signal and outputs the analog source signal to the display panel 110.

The data driver 130 may be implemented in the form of a tape carrier package in which the source driver ICs are mounted, but the embodiment is not limited thereto.

The timing controller 140 may receive a timing signal including a vertical synchronization signal Vsync, a horizontal synchronization signal Hsync, a data enable signal DE and a clock signal CLK of the host apparatus 30. The timing controller 140 generates the data control signal DCS for controlling the data driver 130 and the gate control signal GCS for controlling the gate driver 120.

The data control signal DCS may include a source start pulse (SSP), a source sampling clock (SSC) and a source output enable signal (SOE). The source start pulse (SSP) controls the data sampling start timing of the plurality of source driver ICs (not illustrated) configuring the data driver 130. The source sampling clock (SSC) is a clock signal which controls data sampling timing in each of the source driver ICs. The source output enable signal (SOE) controls the output timing of each source driver IC.

The gate control signal GCS may include a gate start pulse (GSP), a gate shift clock (GSC) and a gate output enable signal (GOE). The gate start pulse (GSP) controls the operation start timing of the plurality of gate driver ICs (not illustrated) configuring the gate driver 120. The gate shift clock (GSC), as a clock signal which is inputted in common to at least one gate driver IC, controls the shift timing of a scan signal (a gate pulse). The gate output enable signal (GOE) specifies the timing information of at least one gate driver IC.

The timing controller 140 receives an image data signal RGB from the host apparatus 30, converts the image data signal RGB into an image data signal RGB' of a form capable of being processed by the data driver 130, and outputs the converted image data signal RGB'.

The touch screen panel TSP may sense a touch on the touch screen panel TSP. The touch screen panel TSP may generate touch sensing raw data (hereinafter, referred to as sensing data) Dtr by using the sensed touch. The sensing data Dtr may include an amount of change in the capacitance of a corresponding touch electrode Et (see FIG. 2), but the embodiment is not limited thereto. The detailed configuration of the touch screen panel TSP will be described later.

The MCU may generate touch data Dt including touch coordinates and/or coordinate data obtained as the touch coordinates are corrected, by using the sensing data Dtr. For example, the MCU may count touches to a plurality of electrodes Et, and may calculate a counted number of touches as a current number of touches. The MCU may obtain the touch intensity of each of the plurality of touch electrodes Et by using the sensing data Dtr. The MCU may track a plurality of touch coordinates by the unit of frame by using the sensing data Dtr. A touch sensing apparatus Su (see FIG. 2) may set a touch label including at least one touch electrode Et, by using the obtained touch intensity. The MCU may set a region corresponding to the touch label by using the touch label. The MCU may generate a labeling group (hereinafter, referred to as a group) by using one or more regions adjacent to each other. The MCU may calculate a largest number of touches among the numbers of touches of one or more touch electrodes Et included in a preset group, as an estimated number of touches of the corresponding group (hereinafter, referred to as an estimated number of touches). The MCU may detect a discontinuous touch among a plurality of touches, by using the current number of touches and the estimated number of touches.

When a discontinuous touch is detected, the MCU may calculate a touch center point (hereinafter, referred to as a center point) corresponding to the group. The MCU may calculate the coordinates of the center point by the unit of frame. The MCU may calculate the coordinates of the center point of a previous frame and the coordinates of the center point of a current frame. The MCU may calculate a motion vector from the coordinates of the center point of the previous frame to the coordinates of the center point of the current frame (hereinafter referred to as a motion vector). The MCU may correct the coordinates of the center point of the current frame by using the motion vector. The MCU may correct the touch coordinates of the current frame by using the corrected coordinates of the center point. The MCU may generate the touch data Dt including the touch coordinates and/or the coordinate data obtained as the touch coordinates are corrected. The MCU may transmit a plurality of touch data Dt to the host apparatus 30. A detailed method for the MCU to generate the touch data Dt by using the sensing data Dtr will be described later.

The host apparatus 30 may be implemented as any one of a navigation system, a set-top box, a DVD player, a Blu-ray player, a personal computer (PC), a home theater system, a broadcast receiver and a phone system, but the embodiment is not limited thereto. The host apparatus 30 may include a system on chip (SoC) having a built-in scaler. The host apparatus 30 converts the image data signal RGB of an input image into a format suitable for being displayed on the display panel 110. The host apparatus 30 may transmit the image data signal RGB and a plurality of timing signals to the timing controller 140. The host apparatus 30 may analyze the touch coordinates by using the plurality of touch data Dt, and may generate the image data signal RGB such that the touch coordinates are outputted in a line form onto the display panel 110. The host apparatus 30 may execute an application program related with coordinates where a touch is made by a user, but the embodiment is not limited thereto.

Hereinafter, a touch screen panel according to an embodiment will be described in detail with reference to FIG. 2.

Figure 2:
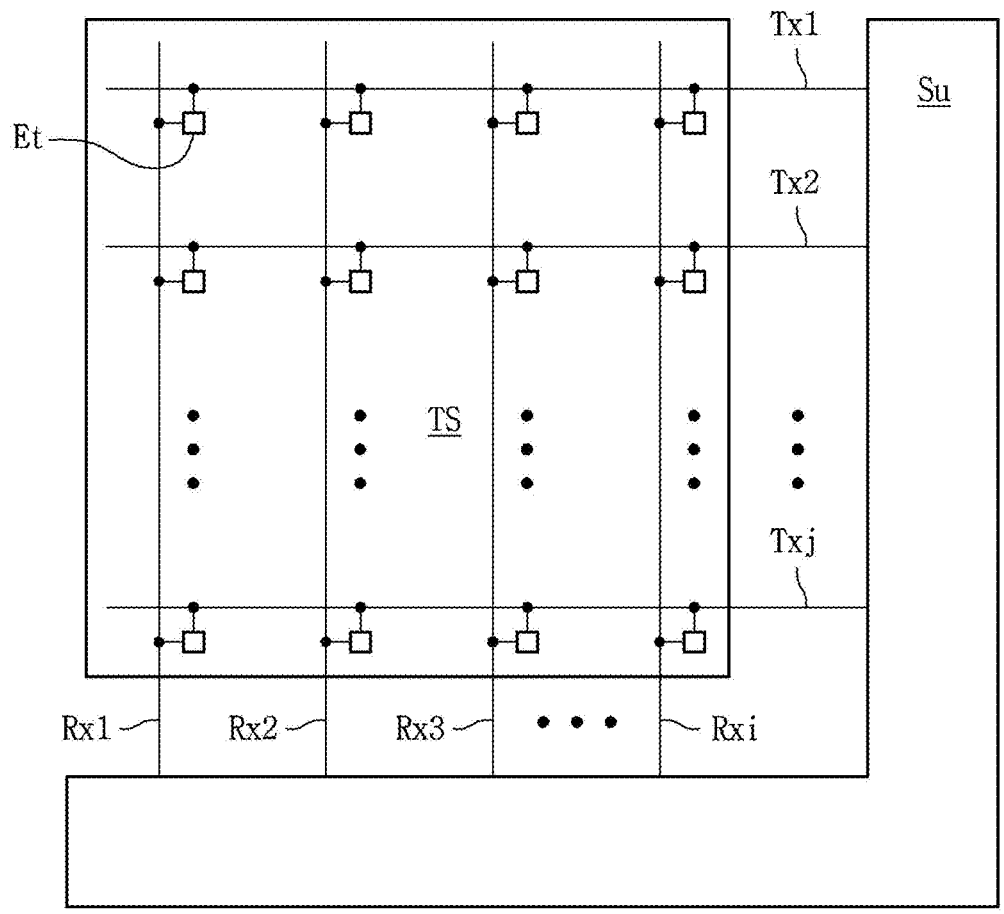
FIG. 2 is a diagram schematically illustrating the configuration of a touch screen panel in accordance with an embodiment.

FIG. 2 is a diagram schematically illustrating the configuration of a touch screen panel in accordance with an embodiment.

Referring to FIG. 2, the touch screen panel TSP includes a touch screen TS and the touch sensing apparatus Su. The touch screen panel TSP may be implemented in a form built in the display panel 110. For example, the touch screen panel TSP may be disposed in an on-cell type or an in-cell type in the display panel 110. A user's touch is inputted on the touch screen panel TSP.

The touch screen TS includes a plurality of touch driving lines Tx1 to Txj (j is a natural number equal to or greater than 2), a plurality of touch sensing lines Rx1 to Rxi (i is a natural number equal to or greater than 2), and the plurality of touch electrodes Et each of which is connected to a corresponding touch driving line among the plurality of touch driving lines Tx1 to Txj and a corresponding touch sensing line among the plurality of touch sensing lines Rx1 to Rxi. A touch driving signal of the touch sensing apparatus Su may be transmitted to the touch electrodes Et corresponding to the plurality of touch driving lines Tx1 to Txj. The plurality of touch sensing lines Rx1 to Rxi may transmit the touch electrode voltages (or charges) of the plurality of touch driving lines Tx1 to Txj to the touch sensing apparatus Su. The touch electrode Et may be formed as a mutual capacitor.

The touch sensing apparatus Su may supply the touch driving signal to each of the plurality of touch electrodes Et. The touch sensing apparatus Su may drive the plurality of touch electrodes Et by using the touch driving signal. The touch sensing apparatus Su may sense a change in the capacitance of the touch electrode Et that occurs according to a touch. The touch sensing apparatus Su may sense a change in the capacitance of at least one touch electrode Et which is touched, through a touch sensing line corresponding to the touch electrode Et among the plurality of touch sensing lines Rx1 to Rxi. The touch sensing apparatus Su may generate the sensing data Dtr including information on the sensed capacitance change.

For the sake of convenience in explanation, it has been described that the touch screen TS is a mutual capacitance type touch screen TS including the plurality of touch driving lines Tx1 to Txj and the plurality of touch sensing lines Rx1 to Rxi, but the embodiment is not limited thereto. As the touch screen TS, a self capacitance type touch screen, in which a touch driving signal and a sensing signal corresponding to a change in capacitance occurring according to a touch are implemented through the touch sensing lines Rx1 to Rxi, may be applied. In the embodiment, a touch may be a touch of a user's finger, a touch of a user's hand or a touch of a stylus pen, but the embodiment is not limited thereto.

Hereinafter, a touch sensing apparatus in accordance with an embodiment will be described in detail with reference to FIG. 3.

Figure 3:
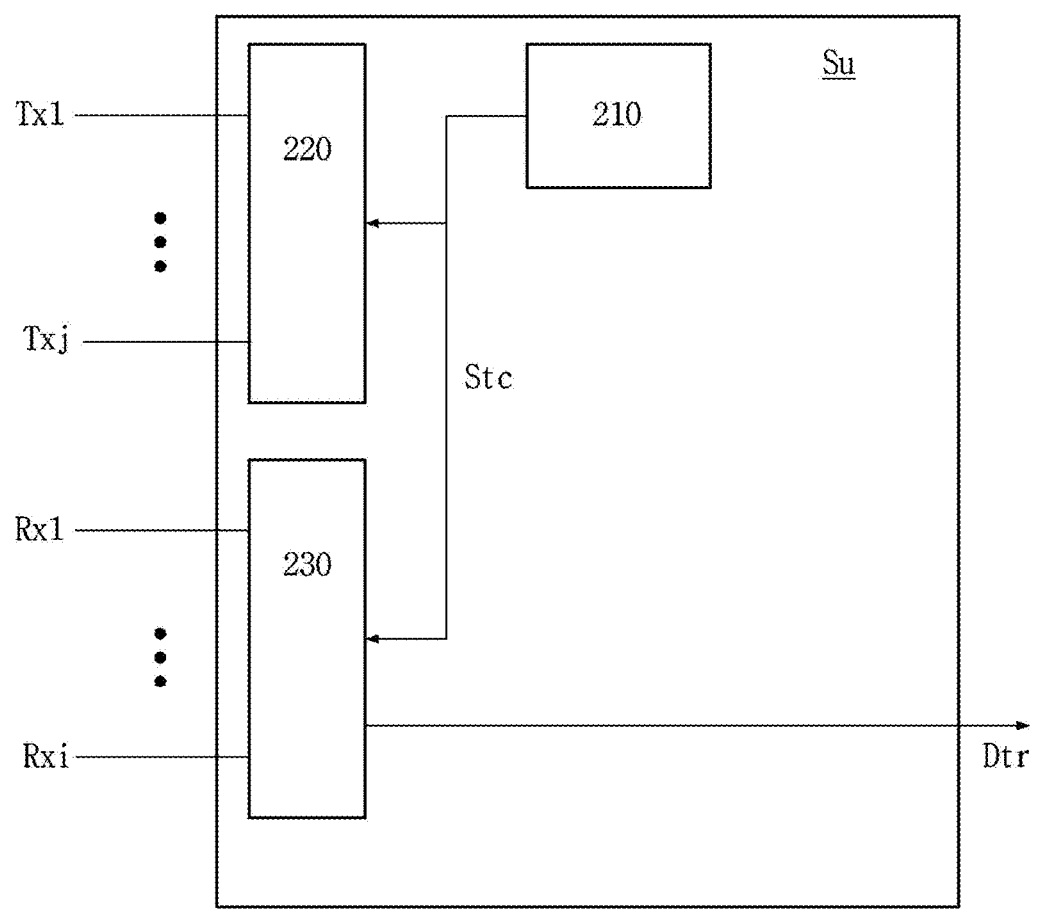
FIG. 3 is a block diagram illustrating the configuration of a touch sensing apparatus in accordance with an embodiment.

FIG. 3 is a block diagram illustrating the configuration of a touch sensing apparatus in accordance with an embodiment.

Referring to FIG. 3, the touch sensing apparatus Su in accordance with the embodiment may include a touch controller 210, a touch driver 220 and a touch sensor 230.

The touch controller 210 may generate a touch control signal Stc which controls the touch driver 220 and the touch sensor 230. The touch controller 210 may generate a plurality of timing control signals (not illustrated) for controlling the operation timing of the touch driver 220 and the touch sensor 230, respectively.

The touch driver 220 selects a touch driving line to which a touch driving signal is to be applied, among the plurality of touch driving lines Tx1 to Txj, according to the touch control signal Stc, and supplies the touch driving signal to the selected touch driving line.

The touch sensor 230 receives the voltages of the plurality of touch electrodes Et through the plurality of touch sensing lines Rx1 to Rxi, respectively, according to the touch control signal Stc. The touch sensor 230 may select a touch sensing line corresponding to a touch, and may receive the signal of a touch electrode Et connected to the selected touch sensing line among the plurality of touch electrodes Et. The touch sensor 230 samples the received signals of the plurality of touch electrodes Et, and accumulates the received signals in an integrator (not illustrated). The touch sensor 230 may input the signals accumulated in the integrator to an analog-to-digital converter (ADC) (not illustrated). The ADC may generate the sensing data Dtr by using the inputted accumulated signals.

The touch controller 210, the touch driver 220 and the touch sensor 230 may be integrated into one touch readout integrated circuit, but the embodiment is not limited thereto.

Hereinafter, an MCU in accordance with an embodiment will be described in detail with reference to FIG. 4.

Figure 4:
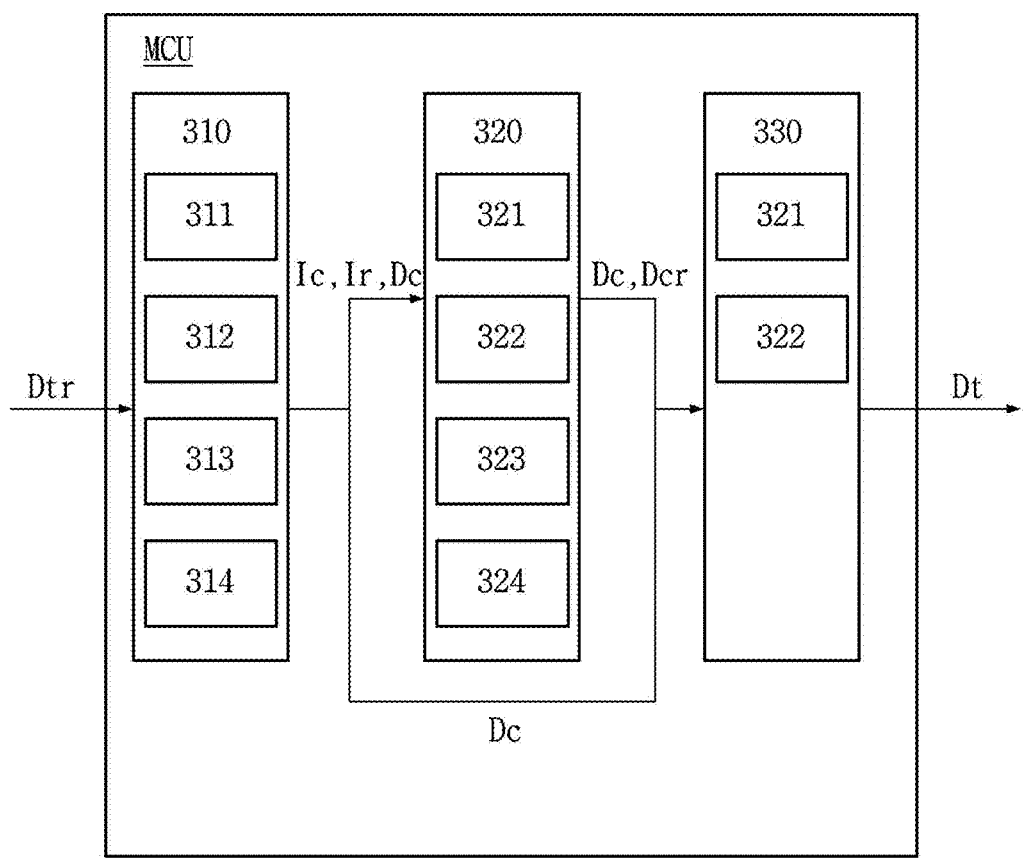
FIG. 4 is a block diagram illustrating the configuration of an MCU in accordance with an embodiment.

FIG. 4 is a block diagram illustrating the configuration of an MCU in accordance with an embodiment.

Referring to FIG. 4, the MCU in accordance with the embodiment includes a coordinate calculator 310 and a coordinate corrector 320.

The coordinate calculator 310 calculates touch coordinates by using the sensing data Dtr. The coordinate calculator 310 includes a data reception unit 311, a touch intensity calculation unit 312, a labeling unit 313 and a touch number comparison unit 314.

The data reception unit 311 may receive the sensing data Dtr.

The touch intensity calculation unit 312 may compare the sensing data Dtr and preset reference data. The touch intensity calculation unit 312 may calculate the difference between the sensing data Dtr and the reference data by using a comparison result. The touch intensity calculation unit 312 may calculate the touch intensity of each of the plurality of touch electrodes Et by using the sensing data Dtr. The touch intensity may be the intensity of the voltage of a touch signal sensed from each touch electrode Et, but the embodiment is not limited thereto. The touch intensity calculation unit 312 may set the average value of the sensing data Dtr obtained from n number of frames, as the reference data. The n number of frames may be set as first n number of frames after the power of the display apparatus 10 is turned on, but the embodiment is not limited thereto.

The labeling unit 313 may set a touch label including at least one touch electrode Et, by using a touch intensity corresponding to each of a plurality of touches and a preset label threshold. In detail, the labeling unit 313 may assign the same identification (ID) to at least one touch electrode Et whose intensity of a corresponding touch signal is equal to or larger than the preset label threshold, among the plurality of touch electrodes Et. For example, the labeling unit 313 may set at least one touch electrode Et corresponding to a first identification, as a reference touch label. The labeling unit 313 may separate the reference touch label into a plurality of touch labels. The labeling unit 313 may sense a plurality of touches corresponding to the plurality of separated touch labels. The labeling unit 313 may sense a plurality of touches by using the number of touch electrodes Et having a strongest touch signal among one or more touch electrodes Et included in the plurality of touch labels, but the embodiment is not limited thereto.

The labeling unit 313 may set a region corresponding to the touch label by using the touch label. The labeling unit 313 may set a group by using a plurality of touch labels. The labeling unit 313 may set a group including at least one touch label by using the distance between the plurality of touch labels. A detailed method in which the labeling unit 313 sets a plurality of touch labels and sets a group will be described later.

The touch number comparison unit 314 may count the number of touches of each of the plurality of touch electrodes Et. For example, when a touch to the touch electrode Et is sensed for one second in a current frame at a scan rate 60 Hz of the touch driver 220, the touch number comparison unit 314 may count 60 as the number of touches. The touch number comparison unit 314 may count the number of touches of each touch electrode Et as a current number of touches. The touch number comparison unit 314 may calculate a current number of touches of the group by using the number of touches of the touch labels. For example, the touch number comparison unit 314 may calculate, as a current number of touches of a second group Gr2, a largest number of touches among a first current number of touches corresponding to a first touch label Lb1, a second current number of touches corresponding to a second touch label Lb2 and a third current number of touches corresponding to a third touch label Lb3.

The touch number comparison unit 314 may calculate the numbers of touches calculated by the units of touch labels as a histogram, and may calculate a largest number of touches as an estimated number of touches of a corresponding group. For example, the touch number comparison unit 314 may calculate, as an estimated number of touches of the second group Gr2, a largest number of touches among a first estimated number of touches corresponding to the first touch label Lb1, a second estimated number of touches corresponding to the second touch label Lb2 and a third estimated number of touches corresponding to the third touch label Lb3.

The touch number comparison unit 314 may compare the current number of touches and the estimated number of touches. When the current number of touches and the estimated number of touches are the same in the unit of label and/or group, the touch number comparison unit 314 may determine that each of the plurality of touches of the current frame is a continuous touch. That is to say, when the estimated number of touches and the current number of touches are the same, the touch number comparison unit 314 may determine that there is no disconnection in the plurality of touches. When determining that there is no disconnection in the plurality of touches, the touch number comparison unit 314 may transmit a reset command Ir to the coordinate corrector 320, and may generate coordinate data Dc including touch coordinates.

When the estimated number of touches and the current number of touches are not the same, the touch number comparison unit 314 may determine that at least one discontinuous touch is included in the plurality of touches of the current frame. In other words, when the estimated number of touches and the current number of touches are not the same in the current frame, the touch number comparison unit 314 may determine that at least one discontinuous touch has occurred among the plurality of touches. For example, when the estimated number of touches and the current number of touches are not the same, the touch number comparison unit 314 may determine that the distortion of a touch has occurred in a line drawing touch. When determining that the distortion of a touch has occurred, the touch number comparison unit 314 may generate a correction command Ic and transmit the correction command Ic to the coordinate corrector 320.

The coordinate corrector 320 may count the number of correction times corresponding to the number of corrected coordinate generation times. The coordinate corrector 320 may initialize the number of correction times according to the reset command Ir. The coordinate corrector 320 includes a correction times count unit 321, a center point coordinate calculation unit 322, a motion vector calculation unit 323 and a corrected coordinate calculation unit 324.

The correction times count unit 321 may count the number of correction times in proportion to the number of times of generating corrected coordinates. The correction times count unit 321 may reset the counted number of correction times to 0 according to the reset command Ir. The correction times count unit 321 may compare the number of correction times and a preset threshold according to the correction command Ic. When the number of correction times exceeds the threshold, the correction times count unit 321 may transfer the coordinate data Dc including the touch coordinates to a touch data generator 330.

When the number of correction times is less than the threshold, according to the correction command Ic, the center point coordinate calculation unit 322 may calculate the sum of the touch intensities of one or more touch electrodes Et included in a corresponding touch label. The center point coordinate calculation unit 322 may calculate the coordinates of a center point by using the sum of the touch intensities. A detailed method for the center point coordinate calculation unit 322 to calculate the coordinates of a center point will be described later.

The motion vector calculation unit 323 may calculate a motion vector by the unit of frame.

The corrected coordinate calculation unit 324 may correct touch coordinates by the unit of frame by using the motion vector. The corrected coordinate calculation unit 324 may generate corrected coordinate data Dcr including the coordinates of corrected touches. A detailed method for the corrected coordinate calculation unit 324 to generate the corrected coordinate data Dcr will be described later.

The touch data generator 330 may generate the touch data Dt including the coordinate data Dc and/or the corrected coordinate data Dcr.

Hereinafter, a method for a labeling unit in accordance with an embodiment to set a label will be described in detail with reference to FIGS. 5 to 9.

FIGS. 5 to 9 are diagrams for explaining a method for a labeling unit to set a touch label in accordance with an embodiment.

The labeling unit 313 may assign the same identification (ID) to at least one touch electrode Et whose intensity of a touch signal is equal to or larger than the preset label threshold, among the plurality of touch electrodes Et. The labeling unit 313 may set at least one touch electrode Et corresponding to the same identification, as a touch label.

Referring to FIG. 5, when the preset label threshold is 20, the labeling unit 313 may allocate a first identification to 15 touch electrodes whose touch intensities are equal to or larger than 20. The labeling unit 313 may set a reference touch label Lb to include the 15 touch electrodes to which the first identification is allocated. Namely, the labeling unit 313 may set the reference touch label Lb to include 15 touch electrodes Et whose touch intensities correspond to 39, 32, 98,43, 84, 35, 28, 93, 39, 36, 58, 20, 95, 43 and 49, respectively. The labeling unit 313 may set a plurality of touch labels by dividing the reference touch label Lb. The labeling unit 313 may sense a plurality of touches corresponding to the plurality of touch labels.

Figure 7:
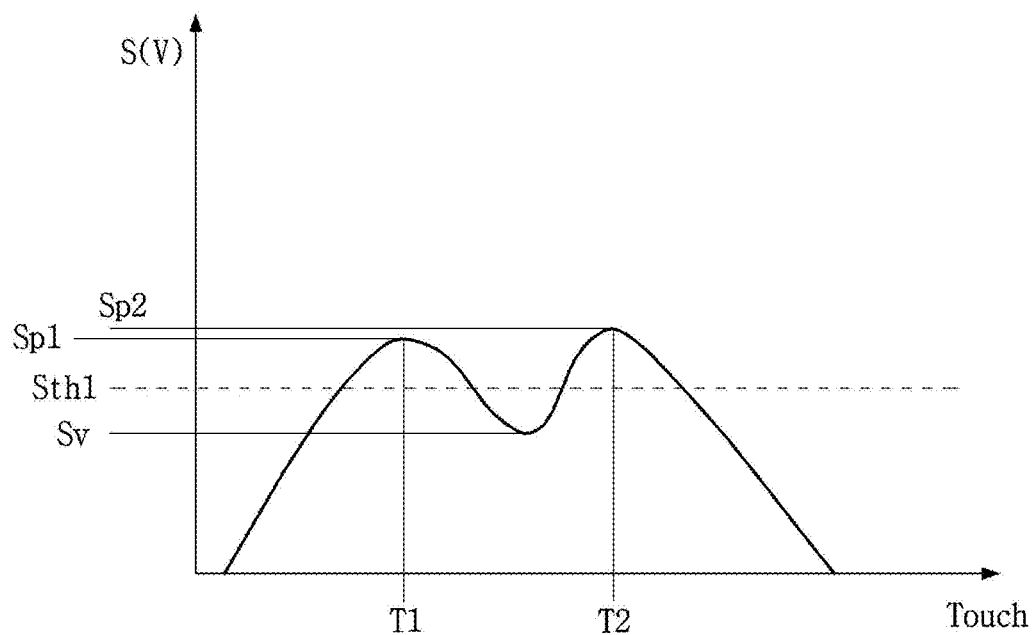

Referring to FIGS. 6 and 7, by using touch signals S of the plurality of touch electrodes included in the reference touch label Lb, the labeling unit 313 may sense a first peak signal Sp1 and a second peak signal Sp2, and may sense a valley signal Sv between the first peak signal Sp1 and the second peak signal Sp2. The voltage of the first peak signal Sp1 and the voltage of the second peak signal Sp2 are both higher than the voltage of a preset first reference signal Sth1, and the voltage of the valley signal Sv is lower than the voltage of the first reference signal Sth1.

The labeling unit 313 may set a first touch label Lb1 corresponding to the first peak signal Sp1 and set the second touch label Lb2 corresponding to the second peak signal Sp2, on the basis of the valley signal Sv. The labeling unit 313 may set the first touch label Lb1 such that a touch electrode Et corresponding to the voltage of a touch signal higher than the first reference signal Sth1 around the first peak signal Sp1 is included in the first touch label Lb1. For example, the labeling unit 313 may set the first touch label Lb1 configured by a plurality of touch electrodes Et whose touch intensities correspond to 39, 32, 98, 43, 84, 35, 28, 93, 39 and 36, respectively. The labeling unit 313 may sense the first touch label Lb1 as a first touch T1. The labeling unit 313 may set the second touch label Lb2 configured by a plurality of touch electrodes Et whose touch intensities correspond to 58, 20, 95, 43 and 49, respectively. The labeling unit 313 may sense the second touch label Lb2 as a second touch T2.

Figure 9:
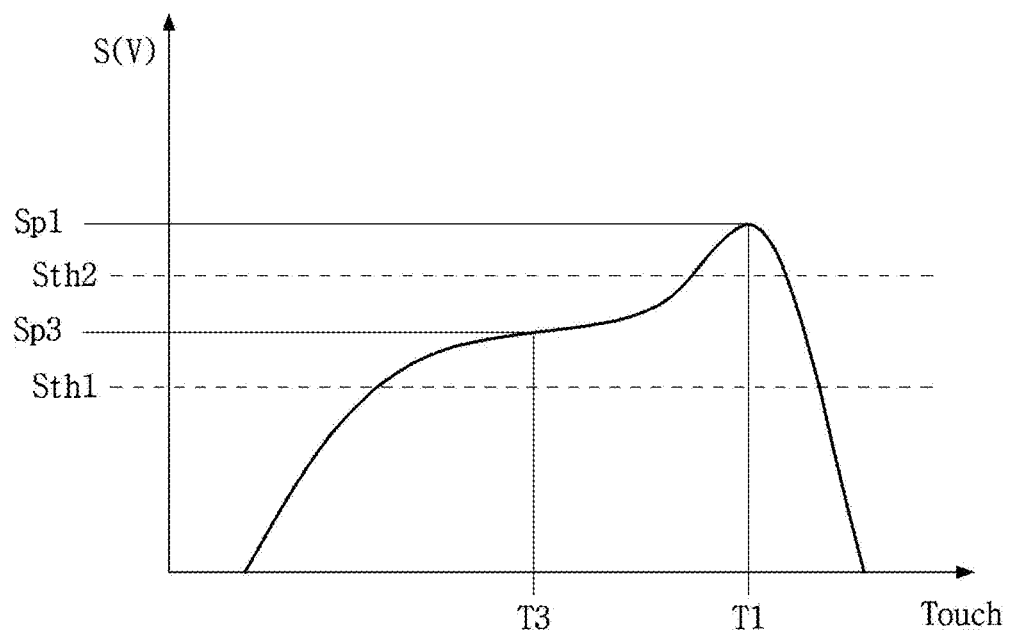

Referring to FIGS. 8 and 9, the labeling unit 313 may change the first reference signal Sth1 to a second reference signal Sth2. The labeling unit 313 may sense a peak signal between the first reference signal Sth1 and the second reference signal Sth2 as a third peak signal Sp3. The labeling unit 313 may set a third touch label Lb3 to include a touch electrode Et corresponding to the voltage of the third peak signal Sp3. For example, the labeling unit 313 may set the third touch label Lb3 configured by a plurality of touch electrodes Et whose touch intensities correspond to 84, 35, 28, 93, 39 and 36, respectively. That is to say, the labeling unit 313 may separate the third touch label Lb3 from the first touch label Lb1 by using the second reference signal Sth2. An overlapping region Cf may be formed between the first touch label Lb1 and the third touch label Lb3. For example, the overlapping region Cf may include touch electrodes whose touch intensities correspond to 84 and 35. The labeling unit 313 may sense the third touch label Lb3 as a third touch T3.

In this way, by changing the voltage of a reference signal, the labeling unit 313 may sense a plurality of respective touches which have no valley signal between a plurality of peak signals. For the sake of convenience in explanation, it was described that the voltage of the first reference signal Sth1 is lower than the voltage of the second reference signal Sth2, but the embodiment is not limited thereto.

Hereinafter, a method for a labeling unit in accordance with an embodiment to set a labeling group will be described in detail with reference to FIGS. 10 to 12.

FIGS. 10 to 12 are diagrams for explaining a method for a labeling unit to set a labeling group in accordance with an embodiment.

Referring to FIG. 10, the labeling unit 313 may set a first labeling region R1 corresponding to a first touch label Lb1. The labeling unit 313 may set a second labeling region R2 corresponding to a second touch label Lb2. The labeling unit 313 may set the first labeling region R1 and the second labeling region R2 by excluding the overlapping region Cf. The labeling unit 313 may set a third labeling region R3 corresponding to a third touch label Lb3. The first labeling region R1, the second labeling region R2 and the third labeling region R3 may all have a rectangular or square shape, but the embodiment is not limited thereto. When the distance between a plurality of labeling regions is within a preset threshold distance, the labeling unit 313 may set the plurality of corresponding labeling regions as one group. When a first distance D1 between the first labeling region R1 and the second labeling region R2 is equal to or less than the preset threshold distance, the labeling unit 313 may set a first group Gr1 to include the first labeling region R1 and the second labeling region R2.

Referring to FIG. 11, when a second distance D2 between the first and second labeling regions R1 and R2 and the third labeling region R3 is equal to or less than the preset threshold distance, the labeling unit 313 may set a second group Gr2 to include the first labeling region R1, the second labeling region R2 and the third labeling region R3.

Hereinafter, a method for a coordinate calculator to generate a center point in accordance with an embodiment will be described with reference to FIG. 13.

Figure 13:
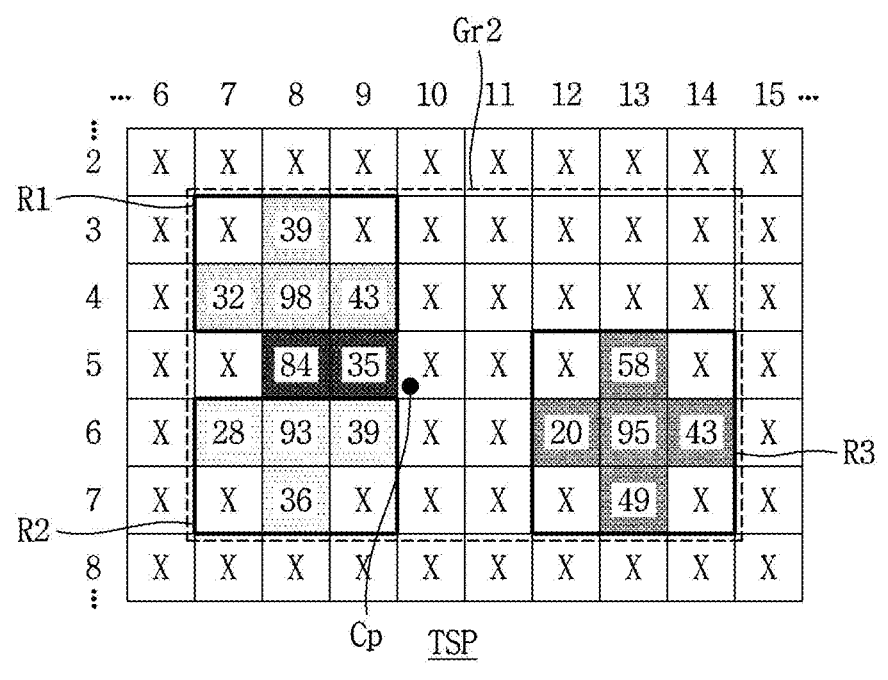

FIG. 13 is a diagram for explaining a method for a coordinate calculator to generate the coordinates of a touch center point in accordance with an embodiment.

The center point coordinate calculation unit 322 may calculate the sum of the touch intensities of one or more touch electrodes Et included in a corresponding touch label, by using Equation 1 below.

$$\text{SUM} = \sum_{n=1}^{N} w_n \quad \text{[Equation 1]}$$

In Equation 1, Wn represents the touch intensity of an n-th touch electrode Et included in the corresponding touch label.

The center point coordinate calculation unit 322 may calculate coordinates (X, Y) of a center point Cp by applying the calculated sum to Equation 2 and Equation 3 below, respectively. The center point coordinate calculation unit 322 may calculate the coordinates of the center point Cp by the unit of group.

$$X = \frac{\sum_{n=1}^{N} x_n w_n}{\sum_{n=1}^{N} w_n} \quad \text{[Equation 2]}$$

$$Y = \frac{\sum_{n=1}^{N} y_n w_n}{\sum_{n=1}^{N} w_n} \quad \text{[Equation 3]}$$

In Equation 2 and Equation 3, xn represents the X coordinate of at least one touch point included in a predetermined touch label, and yn represents the Y coordinate of the at least one touch point included in the predetermined touch label.

Referring to FIG. 13, the center point coordinate calculation unit 322 may calculate the X coordinate and Y coordinate of a touch point included a touch label corresponding to each of the first labeling region R1, the second labeling region R2 and the third labeling region R3 included in the second group Gr2. For example, by using Equations 1 to 3 as follows, the center point coordinate calculation unit 322 may calculate coordinates (9.77, 5.3) of the center point Cp included in the second group Gr2.

$X$=(39*8+32*7+98*8+43*9+84*8+35*9+28*7+
93*8+39*9+36*8+58*13+20*12+95*13+43*14+
49*13)/(39+32+98+43+84+35+28+93+39+36+
58+20+95+43+49)=9.77

$Y$=(39*3+32*4+98*4+43*4+84*5+35*5+28*6+93*6+
39*6+36*7+58*5+20*6+95*6+43*6+49*7)/(39+
32+98+43+84+35+28+93+39+36+58+20+95+
43+49)=5.3

Hereinafter, a method for a coordinate corrector to generate corrected coordinates in accordance with an embodiment will be described with reference to FIGS. 14 to 17.

Figure 14:
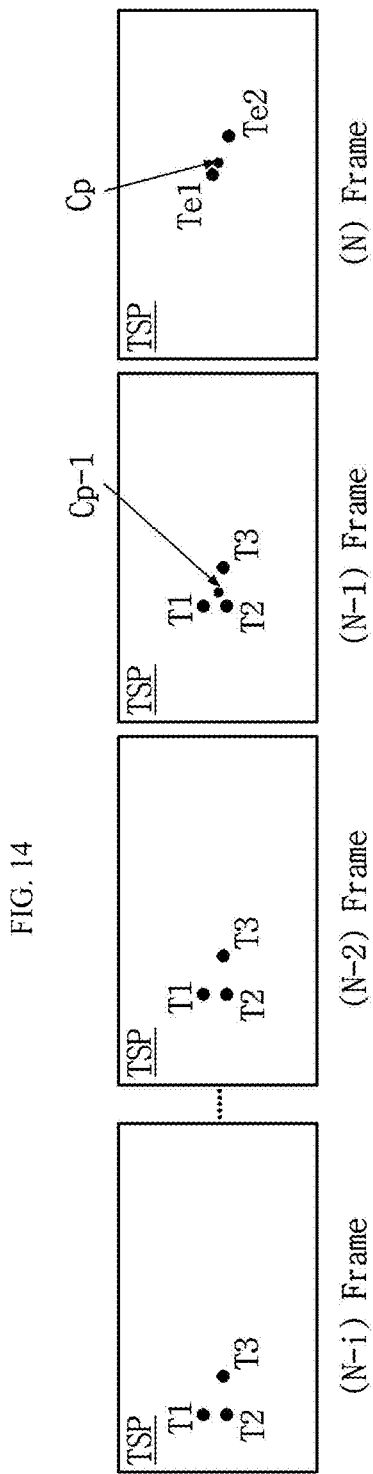
FIG. 14 is a diagram illustrating a plurality of touch points and a center point detected on a touch screen panel according to a frame in accordance with an embodiment.

FIG. 14 is a diagram illustrating a plurality of touch points and a center point detected on a touch screen panel according to a frame in accordance with an embodiment.

Figure 15:
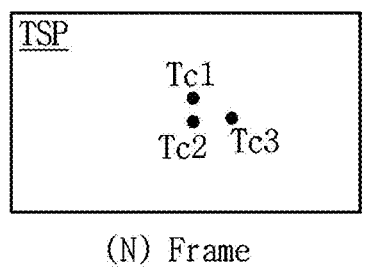
FIG. 15 is a diagram for explaining a method for a coordinate corrector to generate a corrected touch point in accordance with an embodiment.

FIG. 15 is a diagram for explaining a method for a coordinate corrector to generate a corrected touch point in accordance with an embodiment.

Figure 16:
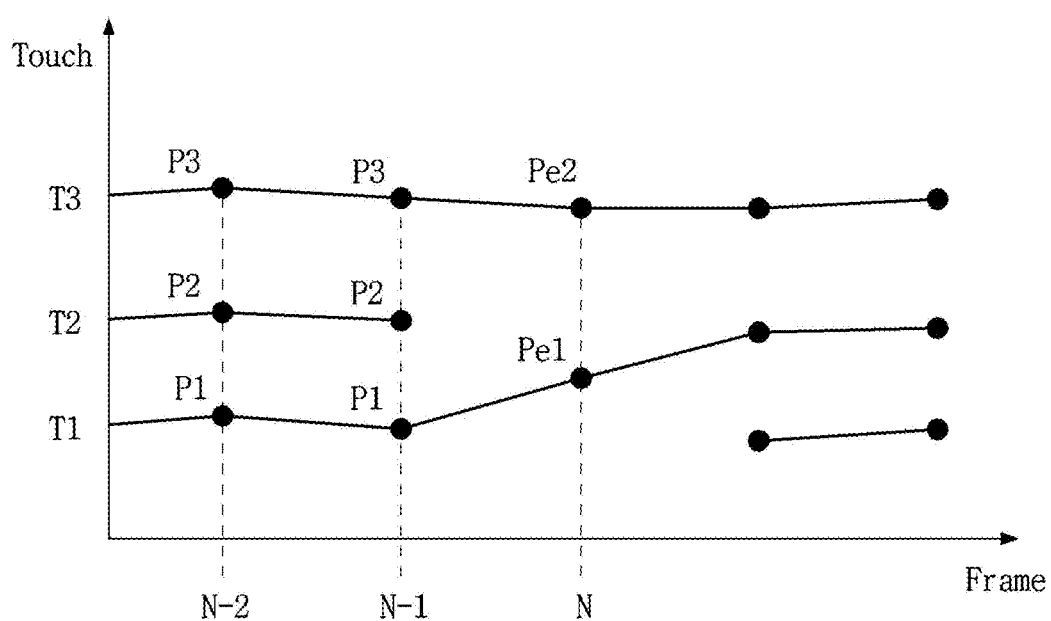
FIG. 16 is a diagram illustrating a plurality of touch points detected on a touch screen panel according to a frame in accordance with an embodiment.

FIG. 16 is a diagram illustrating a plurality of touch points detected on a touch screen panel according to a frame in accordance with an embodiment.

Figure 17:
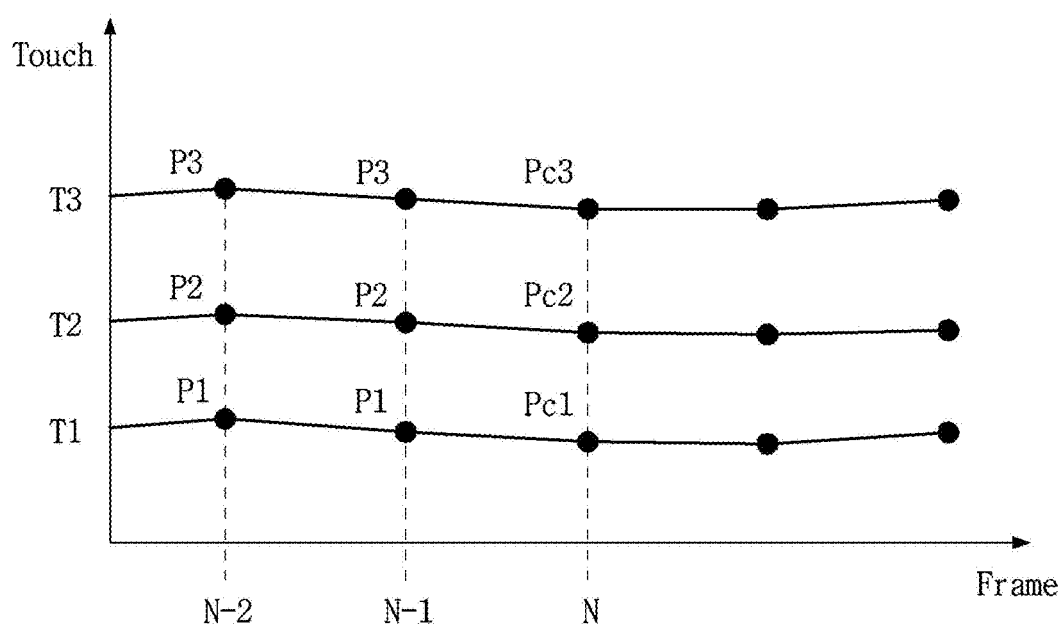
FIG. 17 is a diagram illustrating a corrected touch point according to a frame by using the corrected touch point by the coordinate corrector in accordance with an embodiment.

FIG. 17 is a diagram illustrating a corrected touch point according to a frame by using the corrected touch point by the coordinate corrector in accordance with an embodiment.

Referring to FIG. 14, the touch number comparison unit 314 may calculate the number of touches by the unit of frame. For example, by regarding an N-th frame N as a current frame, the touch number comparison unit 314 may count three touches T1, T2 and T3 from a first previous frame N−1 to a third previous frame N−i. The touch number comparison unit 314 may count the number of current touches from the first previous frame N−1 to the third previous frame N−i, as 3. The touch number comparison unit 314 may calculate an estimated number of touches from the first previous frame N−1 to the third previous frame N−i, as 3. The touch number comparison unit 314 may compare a current number of touches and an estimated number of touches corresponding to the current frame N. The touch number comparison unit 314 determines that the current number of touches and the estimated number of touches are the same as 3, and determines that a discontinuous touch has not occurred among a plurality of touches from the first previous frame N−1 to the third previous frame N−i. In other words, the touch number comparison unit 314 may determine that the plurality of touches from the first previous frame N−1 to the third previous frame N−i are a continuous touch.

In the current frame N, the touch number comparison unit 314 may count two touches Te1 and Te2, and may count a current number of touches as 2. The touch number comparison unit 314 may calculate an estimated number of touches as 3 in the current frame N. The touch number comparison unit 314 may compare the current number of touches and the estimated number of touches of the current frame N. The touch number comparison unit 314 may determine that the current number of touches and the estimated number of touches are not the same in the current frame N, and may detect that at least one discontinuous touch is included in a plurality of touches.

When the touch number comparison unit 314 detects that the discontinuous touch is included in the plurality of touches, the center point coordinate calculation unit 322 may calculate the coordinates of a first center point Cp−1 of the first previous frame N−1, and may calculate the coordinates of a second center point Cp of the current frame N. Since a method for the center point coordinate calculation unit 322 to calculate the coordinates of a center point is the same as described above, detailed description thereof will be omitted.

The motion vector calculation unit 323 may calculate a motion vector extending from the coordinates of the first center point Cp−1 to the coordinates of the second center point Cp. The motion vector may be calculated by the difference between the coordinates of the first center point Cp−1 and the coordinates of the second center point Cp, but the embodiment is not limited thereto.

Referring to FIG. 15, the corrected coordinate calculation unit 324 may delete the coordinates of the two touches Te1 and Te2 of the current frame N, and may calculate the coordinates of three corrected touches Tc1, Tc2 and Tc3 by applying the motion vector to the three touches T1, T2 and T3 of the first previous frame N−1.

The corrected coordinate calculation unit 324 may generate the corrected coordinate data Dcr including the coordinates of the corrected touches Tc1, Tc2 and Tc3.

Referring to FIGS. 16 and 17, the touch number comparison unit 314 may calculate the number of touches by the unit of frame. The touch number comparison unit 314 may compare a current number of touches and an estimated number of touches corresponding to each frame from the second previous frame N−2 to the current frame N. For example, the touch number comparison unit 314 may determine that a current number of touches and an estimated number of touches are the same as 3 in the second previous frame N−2 and the first previous frame N−1. The touch number comparison unit 314 may determine that, from the second previous frame N−2 to the first previous frame N−1, all three touch points P1, P2 and P3 corresponding to the three sensed touches T1, T2 and T3, respectively, are continuous.

The touch number comparison unit 314 may determine that a current number of touches of the current frame N is 2 and an estimated number of touches of the current frame N is 3. The touch number comparison unit 314 may determine that the estimated number of touches and the current number of touches of the current frame N are not the same. Accordingly, the touch number comparison unit 314 may determine that a discontinuous touch has occurred in the current frame N.

The center point coordinate calculation unit 322 may calculate the coordinates of the first center point Cp−1 of the first previous frame N−1, and may calculate the coordinates of the second center point Cp of the current frame N.

The motion vector calculation unit 323 may calculate the motion vector extending from the coordinates of the first center point Cp−1 to the coordinates of the second center point Cp.

The corrected coordinate calculation unit 324 may delete the coordinates of two touch points Pe1 and Pe2 corresponding to the two touches Te1 and Te2 of the current frame N, and may calculate the coordinates of three corrected touch points Pc1, Pc2 and Pc3 by applying the motion vector to the coordinates of the three touch points P1, P2 and P3 of the first previous frame N−1.

The corrected coordinate calculation unit 324 may generate the corrected coordinate data Dcr including the coordinates of the corrected touch points Pc1, Pc2 and Pc3.

Accordingly, when a discontinuous touch is sensed in the current frame N, the MCU in accordance with the embodiment may correct the coordinates of touch points of the current frame N by using the coordinates of touch points of the previous frame N−1.

Therefore, when a disconnection occurs in some of a plurality of continuous touches in a drawing touch, the MCU in accordance with the embodiment may correct a ghosting and a touch distortion occurring during the drawing touch by calculating the coordinates of corrected touches.

Hereinafter, a touch sensing method in accordance with an embodiment will be described with reference to FIG. 18.

Figure 18:
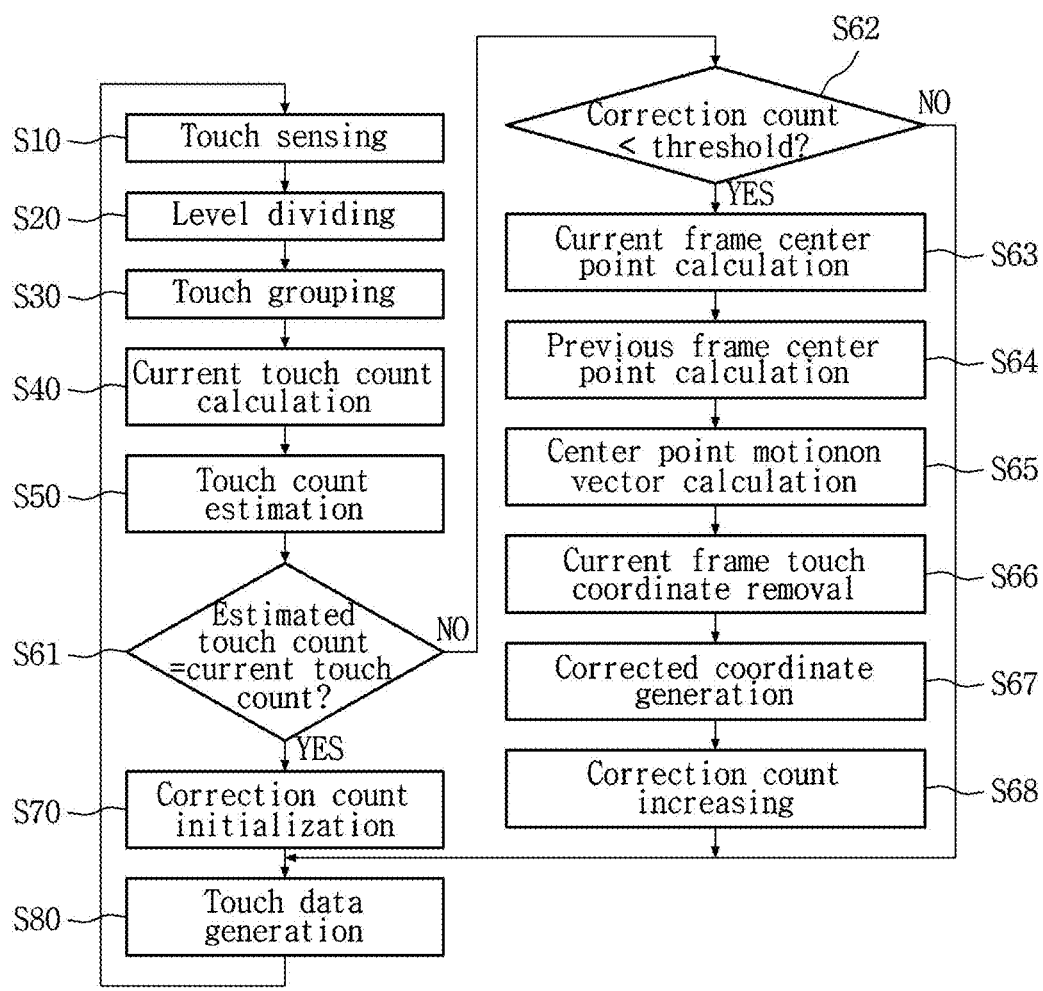
FIG. 18 is a flowchart illustrating a touch sensing method in accordance with an embodiment.

FIG. 18 is a flowchart illustrating a touch sensing method in accordance with an embodiment.

At step S10, the MCU senses a touch to each of the plurality of touch electrodes Et corresponding to a touch on the touch screen panel TSP, and generates the sensing data Dtr.

At step S20, the MCU sets a touch label including at least one touch electrode Et, by using a touch intensity corresponding to each of a plurality of touches and a preset label threshold. The MCU separates the reference touch label into a plurality of touch labels by changing the label threshold on a frame-by-frame basis.

At step S30, the MCU sets a group by using the plurality of touch labels. The MCU sets the group including at least one touch label, by using the distance between the plurality of touch labels. The MCU may set the first labeling region R1 corresponding to the first touch label Lb1. The MCU may set the second labeling region R2 corresponding to the second touch label Lb2. The MCU may set the third labeling region R3 corresponding to the third touch label Lb3. When the first distance D1 between the first labeling region R1 and the second labeling region R2 is equal to or less than a preset threshold distance, the MCU sets the first group Gr1 to include the first labeling region R1 and the second labeling region R2. When the second distance D2 between the first and second labeling regions R1 and R2 and the third labeling region R3 is equal to or less than the preset threshold distance, the MCU sets the second group Gr2 to include the first labeling region R1, the second labeling region R2 and the third labeling region R3.

At step S40, the MCU counts the number of touches by the unit of group or by the unit of labeling region according to the number of frames. The MCU calculates the number of touches as a histogram, and calculates a largest number of touches as a current number of touches.

At step S50, the MCU calculates a largest number of touches among the numbers of touches of the touch electrodes Et included in the second group Gr2 as an estimated number of touches of the second group Gr2 according to the number of frames.

At step S61, the MCU compares the current number of touches and the estimated number of touches by the unit of frame. When the estimated number of touches and the current number of touches are the same, the MCU determines that all of a plurality of touches of a current frame are a continuous touch. When the estimated number of touches and the current number of touches are not the same, the MCU determines that a discontinuous touch has occurred among the plurality of touches of the current frame.

At step S62, when the estimated number of touches and the current number of touches are not the same, the MCU compares the number of correction times with a preset threshold.

At step S63, when the number of correction times is less than the threshold, the MCU calculates the sum of the touch intensities of one or more touch electrodes Et included in a corresponding touch label. The MCU calculates the coordinates of the center point of the current frame N by using the sum of the touch intensities.

At step S64, the MCU calculates the coordinates of the center point of the first previous frame N−1 by using the sum of touch intensities.

At step S65, the MCU calculates the motion vector extending from the coordinates of the first center point Cp−1 to the coordinates of the second center point Cp.

At step S66, the MCU removes the coordinates of the two touch points Pe1 and Pe2 which are sensed corresponding to the current frame N.

At step S67, the MCU calculates the coordinates of the three corrected touch points Pc1, Pc2 and Pc3 by applying the motion vector to the coordinates of the three touch points P1, P2 and P3 of the first previous frame N−1.

At step S68, the MCU counts the number of correction times by increasing the number of correction times by 1 corresponding to the calculation of the coordinates of the three corrected touch points Pc1, Pc2 and Pc3.

At step S70, when the estimated number of touches and the current number of touches are the same, the MCU initializes the number of correction times according to the reset command Ir. The MCU determines that the plurality of touches of the previous frame and the plurality of touches of the current frame are continuous.

At step S80, the MCU generates the touch data Dt including the coordinate data Dc and/or the corrected coordinate data Dcr.

What is claimed is:

1. A touch sensing apparatus comprising:
    a coordinate calculator configured to:
        count a current number of touches and calculate an estimated number of touches, by a unit of touch group using touch data including touch coordinates of a plurality of touch electrodes, and
        detect a discontinuous touch corresponding to a touch group in which the current number of touches and the estimated number of touches are not the same; and
    a touch data generator configured to generate the touch data including corrected coordinate data,
    wherein the estimated number of touches is a number of touches of a touch electrode to which touch has occurred most, among one or more touch electrodes included in the touch group.

2. The touch sensing apparatus according to claim 1, wherein the coordinate calculator comprises:
    a touch intensity calculation unit configured to calculate a touch intensity of each of the plurality of touch electrodes, according to a plurality of touch signals corresponding to the plurality of touch electrodes; and
    a labeling unit configured to compare the touch intensity and a preset threshold, and allocate a first identification to a touch electrode corresponding to a touch intensity equal to or larger than the preset threshold among the plurality of touch electrodes.

3. The touch sensing apparatus according to claim 2, wherein
    the labeling unit senses a first peak signal and a second peak signal by using a plurality of touch signals corresponding to a plurality of touch electrodes included in a reference touch label, and sets a first touch label and a second touch label by using the plurality of touch electrodes included in the reference touch label, and
    the reference touch label is a region which includes a plurality of touch electrodes corresponding to the first identification, the first touch label is a region which includes a plurality of touch electrodes corresponding to the first peak signal among the plurality of touch electrodes included in the reference touch label, and the second touch label is a region which includes a plurality of touch electrodes corresponding to the second peak signal among the plurality of touch electrodes included in the reference touch label.

4. The touch sensing apparatus according to claim 3, wherein
    a magnitude of the first peak signal and a magnitude of the second peak signal are larger than a magnitude of a preset first reference signal, and a signal valley is formed between the first peak signal and the second peak signal, and
    the labeling unit sets the first touch label and the second touch label on the basis of the signal valley.

5. The touch sensing apparatus according to claim 4, wherein
    the labeling unit sets a third touch label which is configured by a plurality of touch electrodes corresponding to a third peak signal among the plurality of touch electrodes included in the first touch label, and the third peak signal is between the first reference signal and a second reference signal, and the second reference signal is lower than the first reference signal.

6. The touch sensing apparatus according to claim 5, wherein the labeling unit sets the touch group by using a distance between the first touch label, the second touch label and the third touch label.

7. The touch sensing apparatus according to claim 6, wherein the coordinate calculator further comprising:
- a touch number comparison unit configured to calculate a current number of touches corresponding to a number of touches of the touch group, count a first current number of touches, a second current number of touches and a third current number of touches, and calculate a largest number of touches among the first current number of touches, the second current number of touches and the third current number of touches as an estimated number of touches of the touch group,
- wherein the touch number comparison unit determines that a discontinuous touch has occurred in the touch group, when the current number of touches and the estimated number of touches are not the same.

8. The touch sensing apparatus according to claim 7, wherein when the current number of touches and the estimated number of touches are not the same in a first frame, the touch number comparison unit determines that the discontinuous touch has occurred in a plurality of touches corresponding to the touch group in the first frame.

9. The touch sensing apparatus according to claim 8, further comprising:
- a center point coordinate calculation unit configured to calculate center point coordinates of the touch group, according to the discontinuous touch, calculate a first center point in the first frame, and calculate a second center point in a second frame,
- wherein the second frame is a frame which is previous to the first frame.

10. The touch sensing apparatus according to claim 9, further comprising:
- a motion vector calculation unit configured to calculate a motion vector; and
- a corrected coordinate calculation unit configured to:
- delete coordinates corresponding to the discontinuous touch among a plurality of coordinates corresponding to the plurality of touches,
- calculate corrected coordinates corresponding to the deleted touch coordinates, and
- generate the touch data including the corrected coordinates,
- wherein the motion vector is a vector which extends from the second center point to the first center point, the corrected coordinates are coordinates which are generated by applying the motion vector to a plurality of touch coordinates of the second frame corresponding to the deleted touch coordinates, and the second center point is a center point of the touch group corresponding to the second frame.

11. A touch sensing method of a touch sensing apparatus suitable for generating touch data including touch coordinates of a plurality of touch electrodes, comprising:
- generating sensing data of each of the plurality of touch electrodes corresponding to a plurality of touches;
- counting a current number of touches by a unit of touch group by using the sensing data;
- calculating an estimated number of touches by the unit of touch group by using the sensing data;
- comparing the current number of touches and the estimated number of touches, and determining that a discontinuous touch has occurred, corresponding to a touch group in which the current number of touches and the estimated number of touches are not the same; and
- generating the touch data including corrected coordinate data,
- wherein the estimated number of touches is a number of touches of a touch electrode to which touch has occurred most, among one or more touch electrodes included in the touch group.

* * * * *